Patented Oct. 9, 1923.

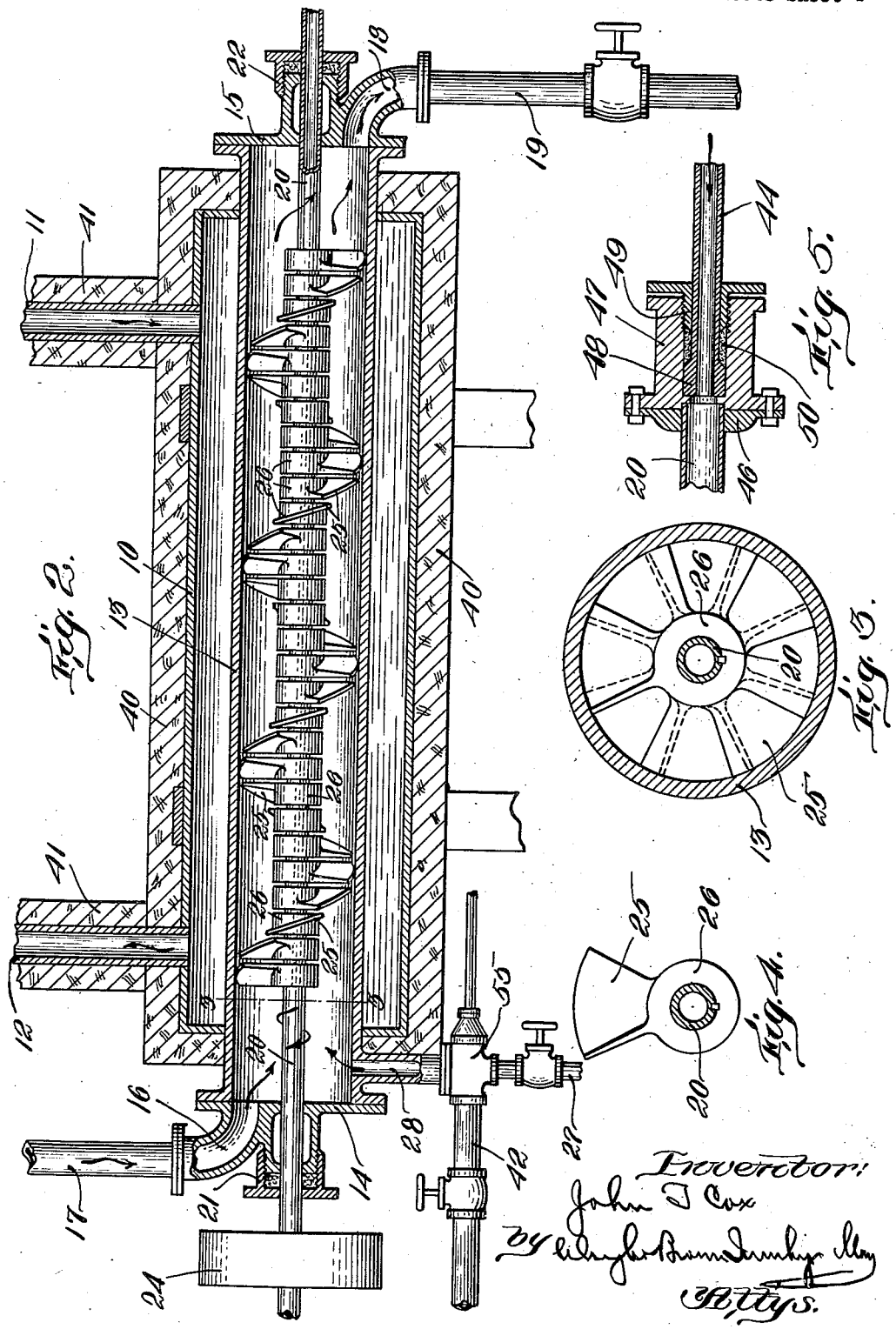

1,469,896

UNITED STATES PATENT OFFICE.

JOHN T. COX, OF BERLIN, NEW HAMPSHIRE, ASSIGNOR TO BROWN COMPANY, OF BERLIN, NEW HAMPSHIRE, A CORPORATION OF MAINE.

APPARATUS FOR TREATING EDIBLE FATS.

Application filed November 26, 1919. Serial No. 340,701.

*To all whom it may concern:*

Be it known that I, JOHN T. Cox, a citizen of the United States, residing at Berlin, in the county of Coos and State of New Hampshire, have invented new and useful Improvements in Apparatus for Treating Edible Fats, of which the following is a specification.

This invention has for its object to provide an improved machine for finishing food fats of the type of lard or butter. In the production of such fats, especially those for use in cooking, it has long been customary to subject them while in heated liquid condition to the action of the refrigerated roll to chill them to thin layers for the purpose of ensuring a homogeneous product in which the solid glycerides are distributed uniformly throughout the mass, and then to subject the chilled fat to a picking operation in which air is incorporated in the mass for imparting smoothness, a certain degree of stiffness thereto, and giving the white appearance to which the housewife is accustomed. I have found that, in finishing fats of a good grade, particularly vegetable fats, by the customary method thus described, in the final "setting" after delivery from the picker, the fat is of a relatively hard and stiff character, especially in cold weather, so that it is with comparative difficulty incorporated with flour or sugar in the usual domestic culinary operation. If, however, the fat can be delivered to the cook, after setting, in a soft, creamy, semi-solid condition so that it can be readily worked into the flour, or "creamed" with sugar, a smaller quantity of such fat can be used, thereby effecting a material saving, and a better product (i. e., bread, pastry, cake, confection or the like) results.

In accordance with the present invention, I provide for the simultaneous chilling and picking of the fat instead of first passing the fat over a rotating refrigerated roll and then picking it by a separate instrumentality or picker.

The invention comprises a cylinder or vessel which is exteriorly refrigerated and through which the fat is caused to pass. Within the vessel there is located a picking instrumentality, in the operation of which the thin films of fat, which are solidified on the interior surface of the vessel, are scraped therefrom and incorporated with the main body of the fat, such films being replaced by others which are subsequently scraped from the wall of the vessel. By the employment of a closed vessel, it is possible to deliver thereto for incorporation in the fat a predetermined quantity of a suitable gas which is non-toxic, so that the fat when delivered from the vessel will contain a certain proportion of such gas. By employing an inert non-toxic and non-inflammable gas, such as nitrogen for example, a cooking fat is produced which is highly resistant to rancidity. Such gas may be dried before delivery to the vessel so as to prevent moisture being entrained therewith and carried to the vessel.

On the accompanying drawings,—

Figure 2 represents a longitudinal section through the combined refrigerating and picking instrumentalities.

Figure 3 represents a cross section on the line 3—3 of Figure 2 on a larger scale.

Figure 4 illustrates one of the picker blades.

Figure 5 illustrates a longitudinal section through the coupling connecting a pipe with the hollow picker shaft.

Figure 1:
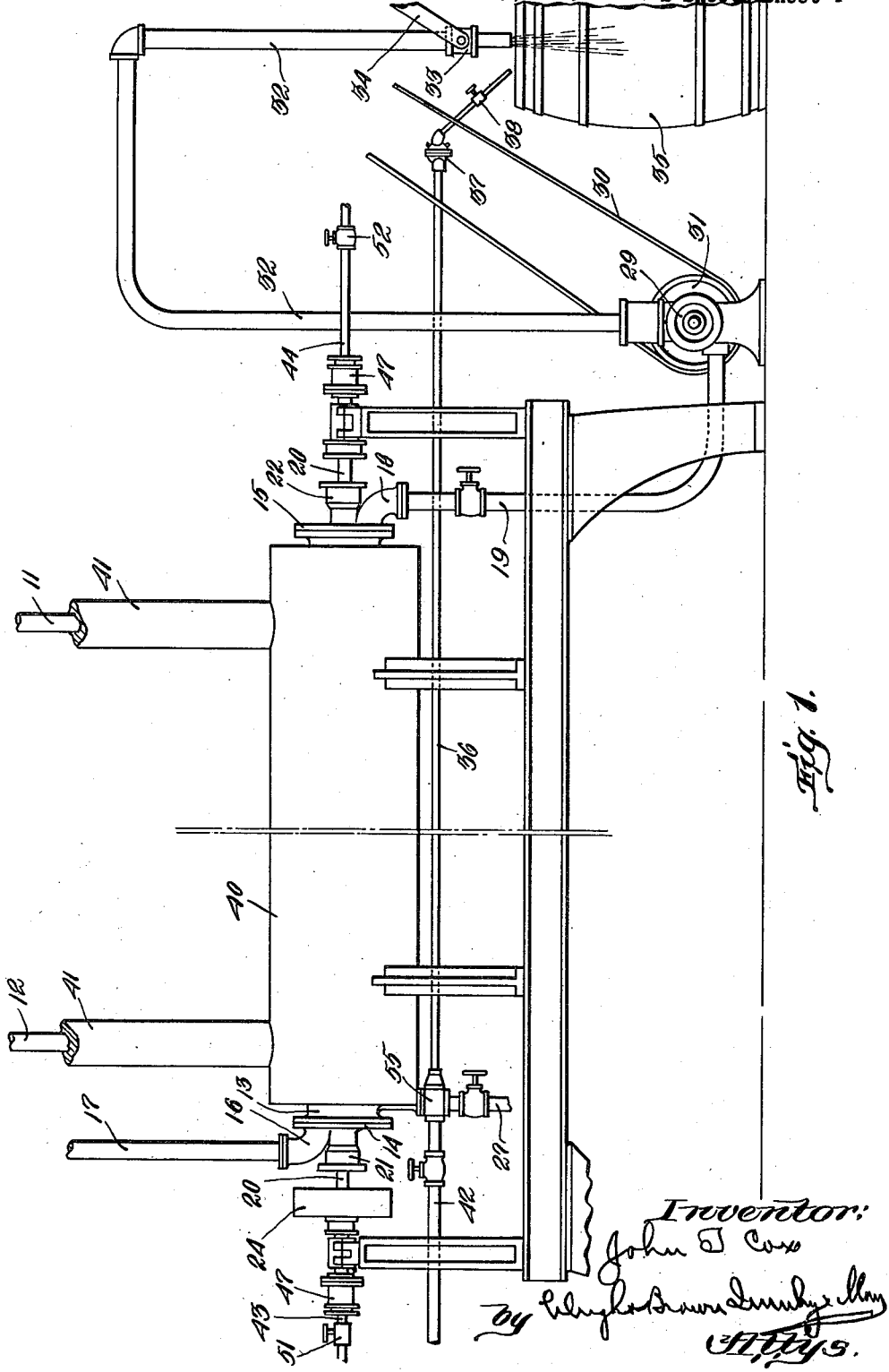
Figure 1 shows a side elevation of an apparatus embodying the invention.

The lard, lard substitute or other fat, which is semi-solid at ordinary temperatures, is produced in the usual way. In producing lard substitutes, the solid fats and oil are heated and blended or the oil is hydrogenized to the desired extent, as indicated by its melting point or iodine value, and the product is refined or deodorized in accordance with modern practice. Such refining or deodorizing, however, is usually omitted in the manufacture of high grade lard. In any event, however, the fat, which is semi-solid at ordinary temperatures, is heated to a temperature above its melting point, so that it is in a liquid state. Preferably it is delivered to the apparatus now to be described at a temperature of approximately 115° to 120° F.

The apparatus, which is illustrated upon the drawing as embodying the invention, may be varied or changed in many particulars without departing from the spirit and scope of the invention as defined in the claims.

This apparatus comprises a cylinder 10 with which are connected inlet and outlet pipes 11, 12, for the refrigerating medium which is utilized for chilling the fat. For this purpose, brine may be employed and it may be delivered to the cylinder 10 at a temperature of approximately zero degrees F. Extending through the cylinder 10, there is a concentric cylinder 13, the ends of which are closed by heads 14, 15. The head 14 is provided with an inlet duct 16 with which is connected the pipe 17 for conducting the liquid fat to the cylinder 13. The head 15 is provided with an eduction conduit 18 with which is connected the pipe 19 for conducting away the vesiculated and refrigerated fat. A shaft 20 is journaled in the interior cylinder 13 and it passes through stuffing boxes 21, 22, on the heads 14 and 15. This shaft is driven at the desired speed by pulley 24 to which a belt extends from any suitable source of power. The shaft 20 is provided with a series of overlapping blades to form in effect a helix extending longitudinally of the shaft. These blades are indicated at 25 and each is provided with a hub 26 which may be keyed or otherwise secured upon the shaft. The outer edges of the blades are arcuate and concentric in respect of the axis of the shaft and are in contact with the wall of the cylinder 13. The function of the blades is to pick, churn or agitate the fat which is delivered to the cylinder 13, and to scrape the solidified films of fat from the internal surface of the cylinder. In addition, these blades force the fat longitudinally of the cylinder so as to effect a continuous flow of the fat therethrough. The blades constitute, as it were, an interrupted helical screw, so that, during each complete rotation of the shaft, the solidified fat is cut from the inner surface of the cylinder and is thrown inwardly and forwardly towards the exit or outlet passage. By centrifugal force the liquid fat is thrown again to the internal surface of the cylinder where it is solidified and then removed from the surface. Communicating with the feeding end of the cylinder, there is a pipe or conduit 27 which is coupled to the inlet port 28 so that nitrogen under pressure may be fed to the left end of the cylinder. The nitrogen is preferably under pressure of say 6 to 8 pounds, and it is used to sweep from the cylinder all of the air that may be therein contained before the fat is admitted to the cylinder. The nitrogen is dried in any suitable way to prevent the entrainment of moisture therewith. The liquid fat is pumped through the inlet pipe 17 into the gas-filled cylinder, and the picker shaft being in operation, the fat is simultaneously chilled, churned and agitated, and the nitrogen is so put into the fat that preferably the finished fat contains from 4% to 10% by volume of nitrogen distributed throughout in minute bubbles or vesicles. The passage of the fat through the cylinder is regulated by the pumps by which the fat is delivered to the cylinder and from which it is removed.

In Figure 1 it will be observed that the pipe 19 is connected to a rotary pump indicated as a whole at 29 and which is operated by a belt 30 and pulley 31. From the pump, a pipe 32 leads to a convenient point for delivering the fat to the containers. As shown, the pipe is provided with a valved nozzle 33, the valve handle being indicated at 34. Previous to the delivery of the finished fat to a container or receptacle such as indicated at 35, the latter may be swept clean of its air by the use of nitrogen. For this purpose, a small pipe 36 is coupled to the pipe 27 and is provided with a swiveled nozzle 37 provided with a valve 38, and which may be depressed so as to discharge the nitrogen into the container.

The cylinder 10 for containing the refrigerant, and the inlet and outlet pipes 11 and 12 for the refrigerant, are preferably insulated by jackets or coverings of cork or other suitable non-conducting material as indicated at 40, 41.

It is desirable that means should be provided for cleaning the refrigerating cylinder and the picker blades therein contained. To this end, the shaft 20 is hollow, and is connected to valved pipes 43, 44, by which steam or hot water may be admitted to and conducted away from the hollow shaft for the purpose of melting the fat on the shaft and blades so that it may all be forced from the cylinder or vessel. The hollow shaft may be connected with these pipes by any suitable form of coupling, such for example as indicated in Figure 5, in which the shaft 20 is shown as having secured thereto a collar 46 to which is bolted a sleeve 47 which is threaded as shown. The pipe 44, for example, which is non-rotary, is provided with an enlarged end 48 between which and the end of a screw 49 there is interposed packing as at 50. When the apparatus is in use, the valves 51, 52 are closed. After the operation is completed and it is desired to clean the parts, the valves 51 and 52 are opened and steam or hot water is forced into the hollow pipe so as to melt and permit the removal of any solidified or partially solidified fat.

For the purpose of washing the refrigerating vessel, a valved pipe 42 is connected to the fitting 55, so that hot water or steam may be delivered into the vessel and conducted therefrom through the conduits 18, 19. This is not ordinarily done, except when the apparatus has been shut down for a considerable time. For removing moisture from the vessel after it has been washed, hot air may be forced through it by means of the pipe 42.

From the foregoing description, it will be apparent that the liquid fat, on being delivered to the cylinder, will be simultaneously agitated, whipped and chilled so that the particles of solid fat are uniformly distributed throughout the entire mass, which contains in addition unsaturated glycerides. The nitrogen at the same time is incorporated in the mass so as to produce a very smooth creamy white semi-solid when it is permitted to set after having been delivered to the container. Preferably the fat is delivered at a temperature of approximately 45° F., and, as stated, contains approximately 4% to 10% by volume of nitrogen or other non-toxic inert gas.

The proportion of gas in the fat may be closely regulated by varying the supply of the gas and of the fat, and the delivery of the fat from the refrigerating cylinder or vessel.

Having thus explained the nature of my said invention and described a way of making and using the same, although without attempting to set forth all of the forms in which it may be made or all of the modes of its use, what I claim is:

1. An apparatus for incorporating a non-oxidizing inert gas in edible fat, comprising the combination of a cylindrical vessel closed to the external atmosphere, means for supplying a liquid fat thereto, means for conducting the fat therefrom, means for exteriorly refrigerating such vessel, means for agitating such fat in such vessel and scraping the solidified fat from the walls thereof, and means for supplying an inert gas to said vessel for incorporation by said agitating means in said fat.

2. An apparatus for converting liquid fat to a semi-solid and incorporating a non-toxic inert gas therein comprising a stationary cylinder closed to the external atmosphere and having inlet and outlet ports at its opposite ends for receiving and discharging such fat, means for exteriorly refrigerating such fat, a central rotary shaft journaled in said cylinder, a plurality of picker blades on said shaft adapted to scrape solidified fat from the interior surface of said cylinder and incorporate said gas in said fat, and means for introducing said gas into said cylinder.

3. An apparatus for converting liquid fat to a semi-solid, comprising a stationary cylinder closed to the external atmosphere and having an inlet and an outlet at its opposite ends for receiving and discharging such fat, means for exteriorly refrigerating such fat, a central rotary shaft journaled in said cylinder, and a plurality of segmental overlapping blades on said shaft forming an interrupted helix, the edges of said blades being substantially in engagement with the interior surface of the cylinder for scraping the refrigerated fat therefrom.

In testimony whereof I have affixed my signature.

JOHN T. COX.